United States Patent
Harrison

[15] 3,685,434
[45] Aug. 22, 1972

[54] BACON COOKER

[72] Inventor: John William Harrison, Mansfield, Ohio

[73] Assignee: Westinghouse Electric Corporation, Pittsburgh, Pa.

[22] Filed: July 1, 1970

[21] Appl. No.: 51,566

[52] U.S. Cl.....................................99/425, 99/446
[51] Int. Cl................................................A47j 37/00
[58] Field of Search......99/375, 42 S, 349, 38 S, 400, 99/444, 445, 446; 248/346.1; 312/229

[56] References Cited

UNITED STATES PATENTS

| | | | |
|---|---|---|---|
| 3,466,998 | 9/1969 | Musgrove | 99/349 |
| 1,516,265 | 11/1924 | Curtiss | 99/375 |
| 3,304,950 | 2/1967 | Hubert | 312/229 X |
| 2,732,696 | 1/1956 | Baker | 99/446 X |
| 2,040,369 | 5/1936 | Fischer | 99/375 X |
| 3,302,555 | 2/1967 | Burwell | 99/400 X |

Primary Examiner—Billy J. Wilhite
Attorney—F. H. Henson, E. C. Arez and Fred A. Winans

[57] ABSTRACT

A cooking appliance having a cooking surface and housing supported on a separate base which also function as a tray to catch and retain the grease which drops from the above cooking surface. The separate units provide easy disposal of the collected grease whereas the legs on the housing of the cooking surface and the walls of the tray cooperate to provide proper registry when stacked together.

3 Claims, 3 Drawing Figures

PATENTED AUG 22 1972

3,685,434

BACON COOKER

BACKGROUND OF THE INVENTION

This invention relates to a cooking appliance especially adapted to cook bacon or other thinly sliced meat and is more specifically related to a bacon cooker such as disclosed in copending application Ser. No. 815,899, of common assignee (now U.S. Pat. No. 3,587,445 which issued June 28, 1971). The cooker has a housing supporting the heater and cooking surface separable from a base which supports the housing and also catches and retains the grease dripping from the cooking meat and adjacent surfaces.

In a cooker, such as described in the above identified copending application, wherein the cooking surface is contoured such that the grease drains from the meat as they are cooked, some means must be provided for collection and retention of such drippings. Heretofore, as is shown in both the above application and in U.S. Pat. No. 3,466,998, issued to D. A. Musgrove, Sept. 16, 1969, this was accomplished by housing the cooking surface in an elevated position and providing a slidable tray or drawer in the base of the housing which collected the grease dripping from the cooking surface and from the meat on the cooking surface. This structure resulted in a rather bulky utensil requiring a relatively large storage space. Further, as the tray became quite full, great care had to be taken in sliding it from its position in the base so as not to cause the grease therein to spill over the sides.

The present invention, providing a base separable from the structure housing the cooking surface and heater, which base is also a container or tray for receiving and retaining grease and so forth therein, permits easier storage by providing two generally smaller components that can be either stored separately or stacked, and allows safer handling of the grease caught in the container in that the cooking surface can be removed while the container remains stationary. These and other advantages of the present invention will become more apparent in the following description.

SUMMARY OF THE INVENTION

An appliance having a cooking surface supported between two end plates which also hingedly support cover members for access to the surface and a separate base member supporting the cooking surface having opposing side walls and end walls providing a trough to catch and retain the grease dripping from the supported cooking surface. The end plates have legs for either supporting the cooking surface on a shelf for storage or for registering with the walls of the base to properly position the cooking surface above the base.

DETAILED DESCRIPTION OF THE PREFERRED EMBODIMENTS

Figure 1:
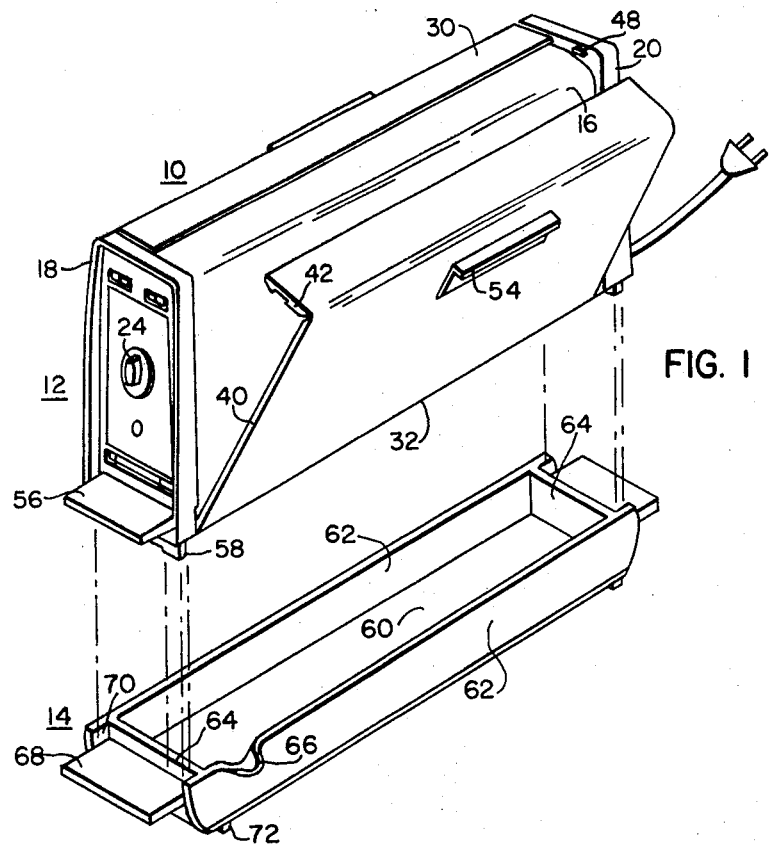
FIG. 1 is an exploded isometric view of the bacon cooker incorporating the invention.

Referring initially to FIG. 1 a cooking appliance 10 is shown which includes two readily separable components, namely, a self-contained cooking unit 12 and a base 14.

Figure 2:
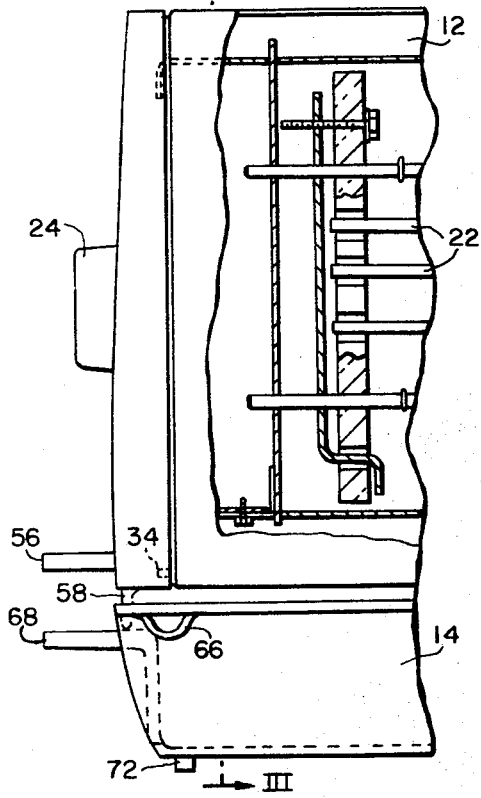
FIG. 2 is a partial side elevational view of the device of FIG. 1 with parts cut away to show the heater.
Figure 3:
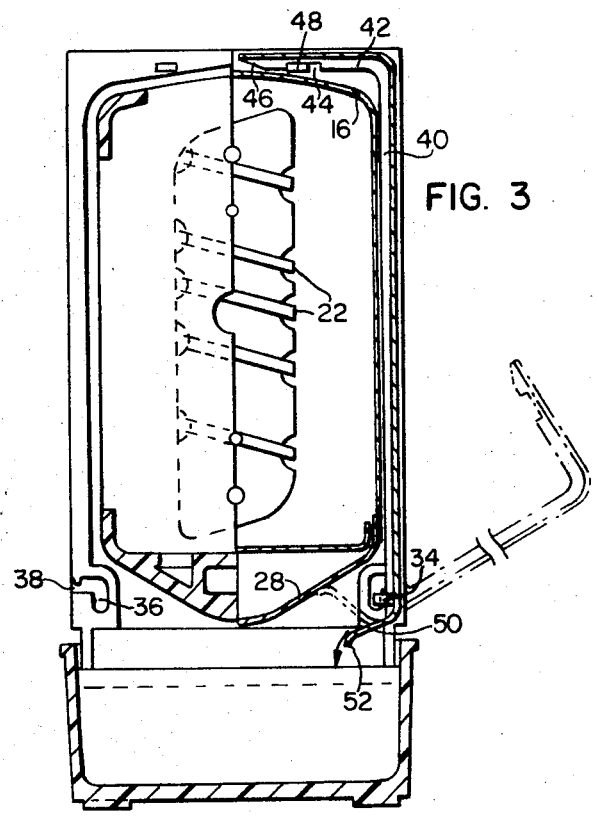
FIG. 3 is an end elevational view taken along lines III—III of FIG. 2.

The cooking unit 12 operates similar to the bacon cooker of the previously identified copending application and, now referring to FIGS. 1 through 3, essentially comprises a generally elongated inverted U-shaped cooking surface 16 supported at each end by substantially rectangular end plates 18 and 20 preferably molded from a phenolic plastic.

The end plates 18 and 20 also support an electric heating element 22 adjacent the inner surface of the cooking surface 16 and control means (not shown) for automatically operating the heater for a selectable period of time as manually set by a control knob 24 operatively connected to the control means through an aperture (also not shown) in one end plate 18. The other end plate 20 has an aperture through which extends an electric cord and plug for connection to the appropriate heater contacts. The chamber formed by the two end plates and the inverted U-shaped cooking surface which houses the heater is closed on the bottom, i.e., the space between the two depending legs of the cooking surface, by a bottom plate 28, having a generally shallow V-shaped configuration, attached by any well-known means to the end plates, thus completely enclosing the electrical heating elements, contacts and controls.

Means for covering the cooking surface 16 comprises a pair of opposing cover members 30 and 32 having a generally inverted L-shaped configuration in cross section and preferably formed from thin sheet metal, hingedly supported in the end plates as by pins 34 attached at each edge adjacent the lower end to extend outwardly thereof, and received in a slot 36 molded in the end plates. The slot 36 has an open throat area 38 through which the pins can be easily inserted or removed from the slots. Also, the slot is elongated in its vertical dimension to permit vertical movement of the cover members while the pins 34 are retained within the slots.

The edges of the cover members are turned inwardly to form flanges 40 on the generally vertical edges of the cover member and flanges 42 on the generally horizontal top edge. (The above dimensions referring to the position assumed when the cover is closed.) Flanges 42 are notched as at 44 and their leading edge tapered as at 46 providing a camming surface leading to the notch.

A short lug 48 only one being shown extends from the inner surface of the end plate and cooperates with the notch 44 to hold the cover members in closed position. To close the covers, they are rotated inwardly with the camming surface lifting the covers, permitted by the elongated slots, until the notches and lugs meet, whereupon the covers drop and are thereby latched. The covers can be opened by vertically lifting them and rotating them outwardly.

The bottom end of the covers is bent inwardly forming shoulder 50 which terminates in a downwardly bent leg 52. As seen in FIG. 3, in the closed position, shown in solid line, the shoulder 50 lies beneath the cooking surface and directs the grease dripping therefrom in a manner to be described later, whereas in the open position shown in dotted line, the leg portion 52 abuts bottom plate 28 to provide a positive stop. Each cover member is provided with a generally non-conductive handle 54 for manipulation of the covers.

The end plates have outwardly extending handles 56, preferably molded integrally therewith and positioned relatively near the bottom for reasons to be discussed later, and short feet 58, also preferably integrally molded, depending from the bottom of the end plates substantially adjacent each side.

The base 14 is also preferably molded from a phenolic plastic as a unitary structure and comprises a generally flat planar bottom 60 having vertically extending thereabove side walls 62 and end walls 64 providing a trough having dimensions at least sufficient to completely underlie the cooking surface. A semi-circular depression in the upper edge of one side wall substantially adjacent a juncture of one side wall and an end wall provides a pouring spout 66.

The upper portion of the end walls 64 have handles 68 extending horizontally outwardly therefrom with the side walls 62 extending beyond the end walls 64 to form shoulders 70 for a reason to be discussed. The underneath surface of bottom 60 has feet 72, preferably one at each corner, on which the base rests.

Referring again to FIG. 1, the two components are shown separated but in proper disposition to stack the cooking unit 12 on the base 14 as is done when the cooking unit is to be used for cooking bacon or the like. The cooking unit 12 will be maintained in proper registry above the base by its feet 58 resting on handle members 68 of the base and abutting against shoulder 70 to prevent side to side movement and against end wall 64 to prevent end to end movement. In this position the cooking surface is so disposed above the base that any grease dripping from the surface will be caught therein. In this respect shoulder 50 and leg 52 of cover members 30 and 32 cooperate to funnel the grease draining from the cooking surface, the meat, and that spattered on the cover members, into the base as clearly shown in FIG. 3.

The relative position of the handles 56 on the lower portion of the and plates with respect to handles 68 on the upper portion of the base 14 makes it possible to grasp both handles on the same side with one hand permitting the two components of the appliance to be easily transported while in the stacked position above described. Further, it is seen that the cooking unit can be readily lifted from the base allowing grease caught therein to be accessible without any lateral or sliding movement of the base and also allows for separation of the components providing greater versatility for storage.

I claim:

1. A cooking appliance for cooking bacon or the like comprising:
   a. a cooking unit having:
      1. a cooking surface;
      2. heating means;
      3. means including opposing end plates for supporting said cooking surface and said heating means therebetween and generally adjacent to each other;
      4. cover means pivotally supported by said supporting means, movable to a position covering said cooking surface; and,
   b. a separable supporting base defining a tray having opposing side walls and opposing end walls; and wherein
   c. said end plates and said supporting base further define cooperating registration means for properly positioning said cooking unit above said supporting base, said registration means comprising:
      1. downwardly directed projections from said opposing end plates, said projections telescopically received adjacent the outer surface of said opposing end walls to properly position the cooking unit with respect to said end walls of said supporting base.

2. The cooking appliance of claim 1 wherein said opposing side walls of said supporting base include short horizontally directed extensions beyond the outer surface of said end walls, and wherein said downwardly directed projections from said end plates are telescopically received adjacent the facing surfaces of said extensions of the opposing side walls to properly position the cooking unit with respect to said side walls of said supporting base.

3. The cooking appliance according to claim 1 wherein said end plates further support outwardly extending handle means and said end walls of said supporting base include outwardly extending handle means substantially co-extensive with said handle means on said end plates when said cooking unit is properly positioned on said supporting base.

* * * * *